(12) United States Patent
Borgs et al.

(10) Patent No.: US 7,798,908 B2
(45) Date of Patent: Sep. 21, 2010

(54) PROMOTIONAL GAMES ARCHITECTURE

(75) Inventors: Christian Herwarth Borgs, Seattle, WA (US); Kamal Jain, Bellevue, WA (US); Neal Freeland, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 883 days.

(21) Appl. No.: 11/677,308

(22) Filed: Feb. 21, 2007

(65) Prior Publication Data

US 2008/0200252 A1    Aug. 21, 2008

(51) Int. Cl.
*A63F 9/24* (2006.01)
*A63F 13/00* (2006.01)
*G06F 17/00* (2006.01)
*G06F 19/00* (2006.01)

(52) U.S. Cl. ...................................................... 463/49
(58) Field of Classification Search ................... 463/16, 463/17, 42, 47
See application file for complete search history.

(56) References Cited

U.S. PATENT DOCUMENTS

| | | | |
|---|---|---|---|
| 5,820,459 A | 10/1998 | Acres et al. | |
| 6,561,811 B2 | 5/2003 | Rapoza et al. | |
| 6,656,050 B2 * | 12/2003 | Busch et al. | 463/42 |
| 6,908,391 B2 | 6/2005 | Gatto et al. | |
| 2004/0204247 A1 | 10/2004 | Walker et al. | |
| 2004/0224771 A1 | 11/2004 | Chen et al. | |
| 2005/0021159 A1 | 1/2005 | Ogawa | |
| 2005/0026700 A1 | 2/2005 | Blanco | |
| 2005/0148377 A1 | 7/2005 | Goldberg et al. | |
| 2005/0215310 A1 | 9/2005 | Boyd et al. | |
| 2006/0143285 A1 | 6/2006 | St-Denis | |

FOREIGN PATENT DOCUMENTS

WO    9939312 A2    1/1998

OTHER PUBLICATIONS

Network Game http://www.ufoot.org/liquidwar/v5/doc/network last viewed Dec. 14, 2006, 9 pages.
PSP Play Station Portable http://au.playstaion.com/psp.index.jhtml last viewed Dec. 14, 2006, 3 pages.
Von Ahn, et al. "Labeling Images with a Computer Game" (2004) ACM, 8 pages.

* cited by examiner

*Primary Examiner*—Pierre E Elisca
*Assistant Examiner*—Reginald A Renwick
(74) *Attorney, Agent, or Firm*—Lee & Hayes, PLLC

(57) ABSTRACT

The claimed subject matter relates to an architecture that can facilitate promotion of an online service. The architecture can provide for a games platform that can host a variety of games. The hosted games can be designed such that a user's experiences can be enhanced by game cards that can be discovered and retrieved while using the online service being promoted. Accordingly, the user's experiences can be enhanced as a function of the usage of the online service being promoted.

18 Claims, 11 Drawing Sheets

PROMOTIONAL GAMES ARCHITECTURE

BACKGROUND OF THE INVENTION

In the offline world it is common for business to offer promotions in order to increase market share or to, ultimately, increase sales. Many promotions are costly for the promoter, and are essentially limited to subsidies to confirmed customers (e.g., in return for a purchase, a discount can be provided). Conventional promotions typically use nothing more than the underlying product and a discount to leverage the promotion.

Many promotions have adopted the notion of "rewards" points that can be collected and subsequently redeemed for other goods or services. However, such promotions, due to the miniscule value of the rewards points in relation to what must be purchased in order to redeem the points for something of value, generally are not effective in soliciting new customers, but rather, are mostly employed by existing prolific customers who save the points, but would probably have purchased the underlying product in any event.

Other conventional promotions have adopted the notion of game pieces, which can be collected and traded to (arguably) increase the chances of winning a prize. However, to win a jackpot, all but one or a small number of the total game pieces necessary to win are common, whereas the remaining one or few game pieces are rare. Thus, the promotion is effectively reduced to a sweepstakes since the acquisition of the rare game piece (which would not be traded by a rational collector) is effectively the equivalent to winning.

SUMMARY OF THE INVENTION

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one aspect thereof, comprises computer-implemented techniques for employing a gaming platform for facilitating promotion of online services. For example, conventional promotion mechanisms are essentially limited to leveraging only the products or services of the underlying business, or in some cases providing other products or services based upon prolific transactions of existing customers. In contrast, the claimed subject matter can facilitate promotions that are leveraged by the popularity, educational, and/or entertainment value of games, even when the games are not associated with the business to be promoted.

Accordingly, the promotions of the gaming platform can be self-promoted in the process of promoting an online service, as well as leverage already popular online services. The gaming platform can be designed such that it is substantially resistant to fraud, and capitalize on numerous viral marketing opportunities and/or sponsorships. Moreover, the games provided by the gaming platform can be educational and/or informative, as well as other entertainment characteristics such that experiences can be truly enjoyed by a wider audience than merely the set of winners.

In accordance with one aspect of the claimed subject matter, a gaming platform can provide access to a set of games. The games can be designed such that a game play experience can be enhanced by acquisition of game cards. In accordance therewith, the gaming network can promote an online service by allowing the online service to issue the game cards. Accordingly, a user's gaming experience can be a function of usage of the online service to be promoted, which can create a natural promoting mechanism for the online service.

It is to be appreciated that the service to be promoted need not have any affiliation with or control of the game in which the game cards are used. In fact, the game card supplied by the online service can be generic and/or featureless, and only be given attributes once the user associates the game card with a particular game. Moreover, the online service can intermingle the game card with content desired to attract eyeballs, but generally results in "banner blindness" (e.g., the user does not notice ads placed in an ad banner due to the banner blindness phenomenon). Additionally, various mechanisms exist to mitigate fraudulent behavior such as botting software employed to collect the game cards without a legitimate desire to use the services of the promoted online service. In accordance therewith, both fraud and banner blindness can be mitigated.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
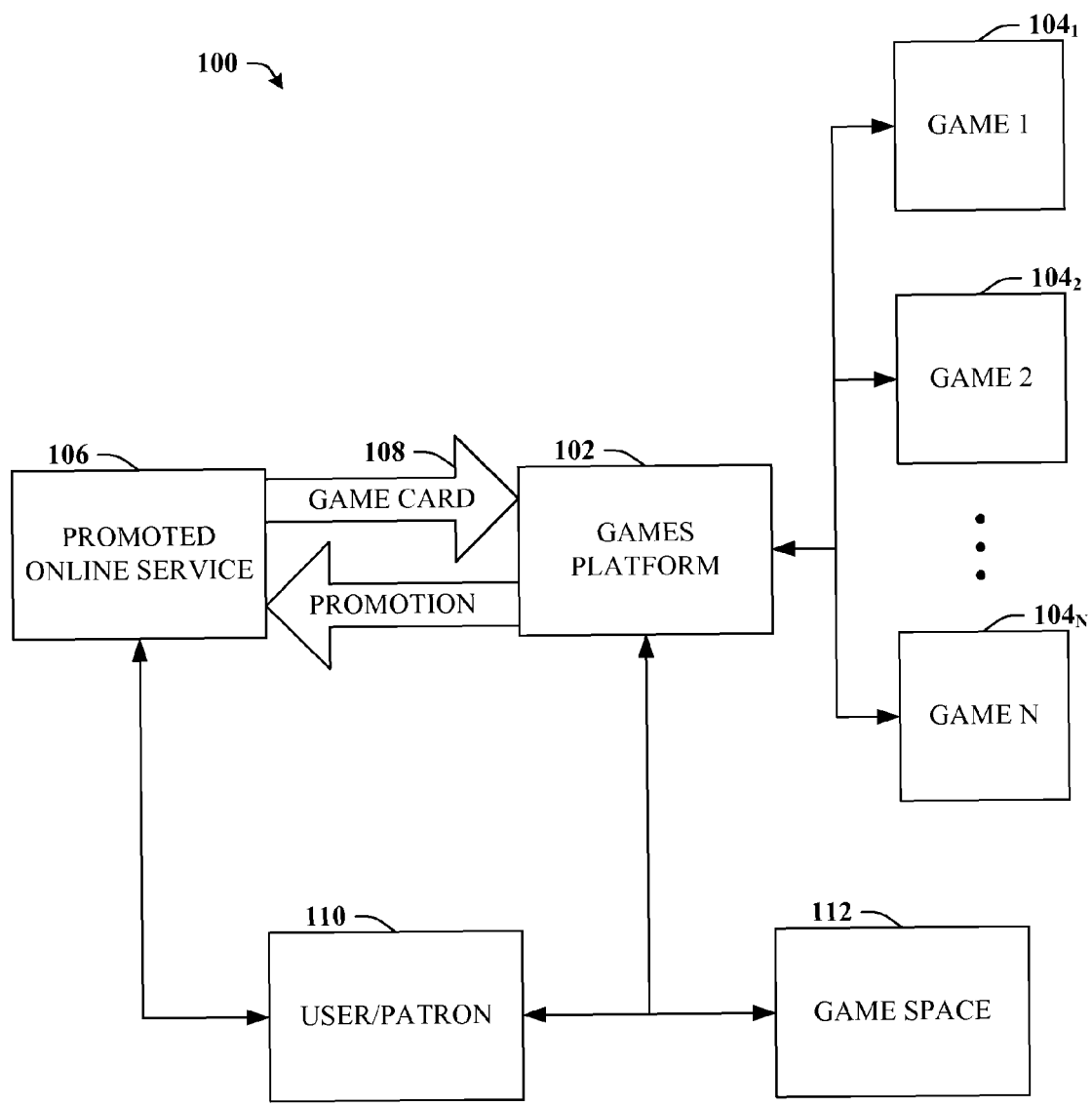
FIG. 1 is a block diagram of a computer-implemented system that can host games, wherein a gaming experience can be a function of usage of a disparate online service.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", "game card", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Referring now to the drawing, with reference initially to FIG. 1, a computer-implemented system 100 that can host games, wherein a gaming experience is a function of usage of a service is depicted. Generally, the system 100 can include a games platform that can provide access to a set of games $104_1$-$104_N$. Each of the set of games $104_1$-$104_N$ can be referred to herein either collectively or individually as game(s) 104 although each of the games 104 can have individual characteristics that distinguish the game 104 from other games 104. The games 104 can be educational, entertaining, or a combination of the two such as a trivia game 104. Moreover, the games 104 can be solo games 104 or multiplayer games 104. Multiplayer games 104 can be competitive or cooperative and can be played with friends and/or with anonymous third parties.

Games 104 can attract users (e.g., user 110) in a variety of ways. As one example, winners of a game can be provided with rewards (detailed further infra), public recognition (e.g., top player scores list), but it should be appreciated that many of the games 104 associated with the games platform 102 can have underlying entertainment or educational value that is its own incentive. The games 104 are typically designed such that game play relates in some fashion to a game card (e.g., game card 108). For example, the game 104 can be of a board game variety wherein the game cards 108 are placed on the board to facilitate game play. An example of such can be found in connection with FIG. 9 below. In accordance with another aspect, the game 104 can relate to trivia, and the game cards 108 can each include one or more trivia questions. As another example, the game 104 can require a game card 108 as a price of admission and/or a credit in order to gain access to the game 104 and/or to gain access to particular levels.

It is of course impossible to describe every type of game 104 as well as how a given game 104 can employ the game card 108, but it can be readily understood that many other games 104 are contemplated to be within the scope and spirit of the claimed subject matter. As well, it should be appreciated that the games 104 can be designed and/or implemented by professional game developers as well as by amateurs such as users of the game platform 102. For example, Application Programming Interfaces (APIs) for the games, as well as global gaming rules associate with game cards 108 can be published such that users 110 can design their own games 104 and/or create their own skins, scenarios, mods, etc. for an existing game 104.

In addition to providing access to a set of games 104, the games platform 102 can also promote an online service 106. The promoted online service 106 can be disparate from the game platform 102 and/or largely or entirely unrelated to the games 104. For example, while the game platform 102 can provide a portal to a variety of games, the promoted online service can be, e.g., a search engine or other search mechanism; a communication service such as email, chat or the like; a subscription service or other online content service; a weather, stock, or other informational service; or substantially any service that can benefit by being promoted, e.g., by materially increasing usage and/or the quality of the usage of the service.

In addition to the games platform 102, the system 100 can also include a game card 108, which as discussed supra, can facilitate an enhanced experience for a game 104. Generally, the game card 108 is issued by the promoted online service 106, whereupon the game card 108 can be made available to a patron 110 of promoted online service 106. The patron 110 using the promoted online service 106 can collect the game card 108 (e.g., by clicking on a token) from the promoted online service 106. The game card 108 can then be delivered to the games platform 102 and, e.g., deposited in a game space 112 associated with an account of a user 110. As such, a natural and symbiotic relationship can exist and/or be cultivated between the games platform 102, the promoted online service 106, and the user/patron 110, as illustrated in FIG. 2.

Figure 2:
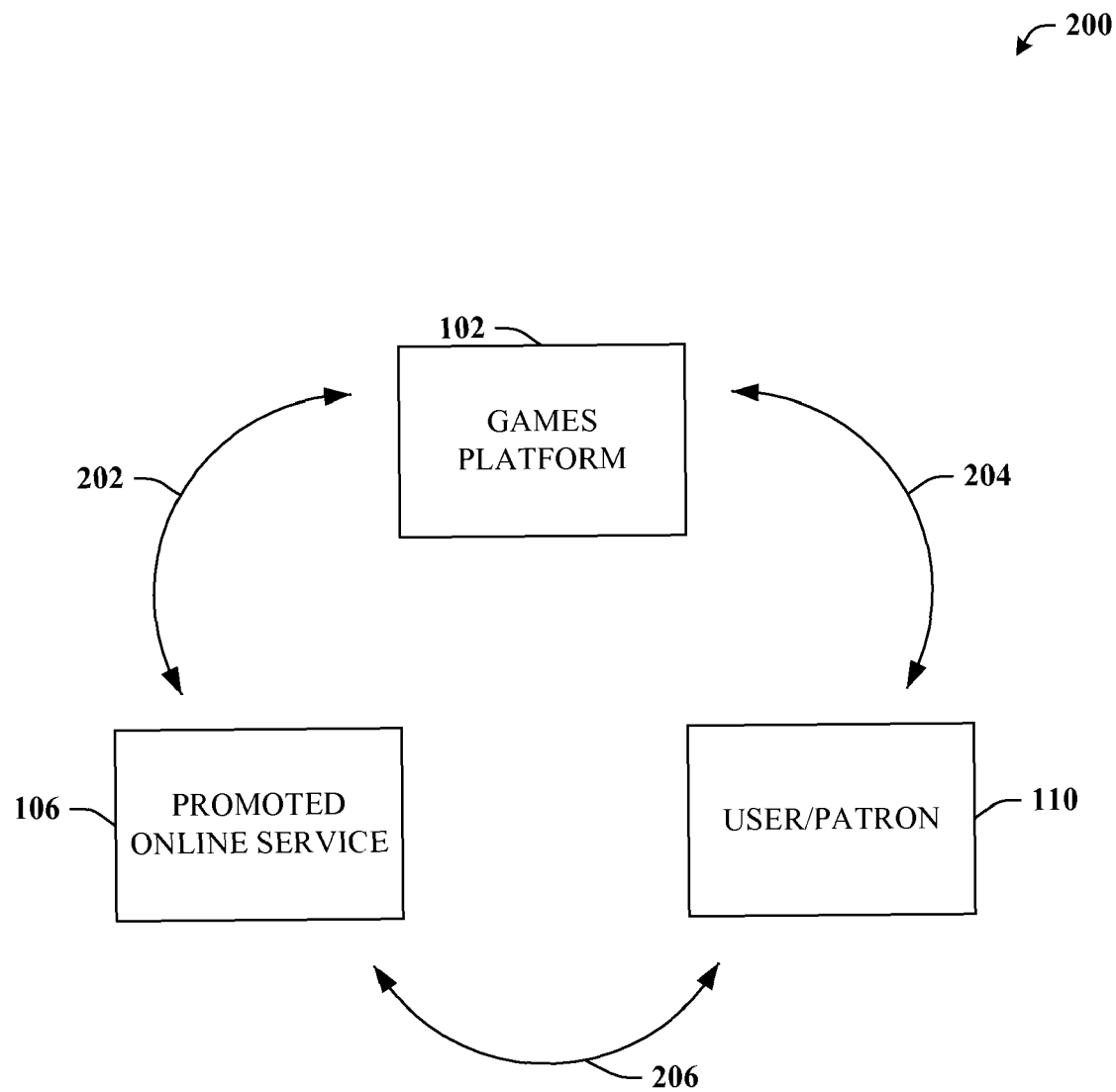
FIG. 2 depicts a block diagram of exemplary relationships between various actors associated with a games platform.

Before continuing the discussion relating to FIG. 1, turning briefly to FIG. 2, a block diagram of exemplary relations between various actors is illustrated. In general, relationship 202 can exist between the games platform 102 and the promoted online service 106. Games platform 102 can promote the promoted online service 106 by driving traffic to the promoted online service 106. Whereas, the promoted online services 106 issues and provides game cards 108 to the games platform 102. Relationship 204 can exist between the games platform 102 and the user 110. The user 110 can obtain entertainment and/or educational value from the games of the games platform 102 and in return represent a user base that the games platform 102 can leverage (e.g., by trafficking the promoted online service 106). Relationship 206 can exist between the promoted online service 106 and the patron 110. The patron 110 can patronize the promoted online service 106 (e.g., use or browse web documents), and in return gain the opportunity to obtain game cards 108.

It is to be appreciated that the user 110 and the patron 110 can in some instances be used interchangeably, while in other instances there may exist subtle distinctions based upon context even though both the patron 110 and the user 110 can be the same entity. For example, reference numeral 110 can refer to a patron 110 when that patron 110 is using the promoted online service 106, but to user 110 in the context of the games platform 102. One rationale for this is the notion that the user 110 can login to the games platform 102 (e.g., in order to access that user's game space 112) with a secure, authenticated, and/or "universal" (e.g., passport-type login) user identity that can be the same user identity employed for other online services, potentially including the promoted online service 106.

In that case, whenever the patron 110 is using the promoted online service 106, he or she can be (transparently) logged into the games platform 106 such that upon discovery of a game card 108, the patron 110 need not interrupt the usage of the promoted online service 106 in order to manually login to the games platform 102 to deposit the game card in the user 110 account. Rather, the patron 110 can click on the game card 108 and have it automatically deposited in the game space 112 associated with an account of the user 110. Moreover, by employing a universal login as described, the game cards 108 need never be transmitted over a medium that may risk a failure of the games platform 102 to monitor and/or enforce rules associated with the game cards 108. It is to be appreciated that additionally or alternatively, a user 110 account (e.g., a game space 112) can be associated with a cookie included on the user's 110 machine for depositing game cards 108. It is also to be appreciated that, although by no means necessary, the game card 108 may not appear on the promoted online service 106 unless the patron 110 is logged on to the games platform 102 and/or his or her game space 112.

Furthermore, the relationships described herein can also serve to document the effectiveness of the promotion to the promoted online service 106. For example, many clicks on game cards 108 from patrons of the promoted online service 106 can serve to illustrate a high success rate of the promotion and/or the popularity of the games platform 102.

Referring back to FIG. 1, it is to be appreciated that a virtually unlimited number of users 110 can interact with the games platform 102. Each user 110 can have an associated game space 112. The game space 112 can house all game cards 108 of a user 110, as well as being customizable/configurable in many ways. For example, game spaces 112 can be required to conform to global rules set by the games platform 102. In addition, the user 110 can customize his or her own game space in a variety of ways (e.g., selecting from and/or uploading various media), including the ability to select a list of favorite or "active" games from the set of games 104, which is further detailed in connection with FIG. 4. Furthermore, the user 110 can customize the game space 112 by setting permissions with respect to how and with whom the game cards 108 can be exchanged, as detailed more thoroughly in conjunction with FIG. 5.

When game cards 108 are transmitted to the games platform 102, they are typically deposited into the game space 112 associated with the user/patron 110, as described supra. However, in accordance with an aspect of the claimed subject matter, other acts can be facilitated, which can be determined based upon a type of game card 108 that the promoted online service 106 issues, which can be explained in more detail with reference to FIG. 3A-C.

Figure 3A:
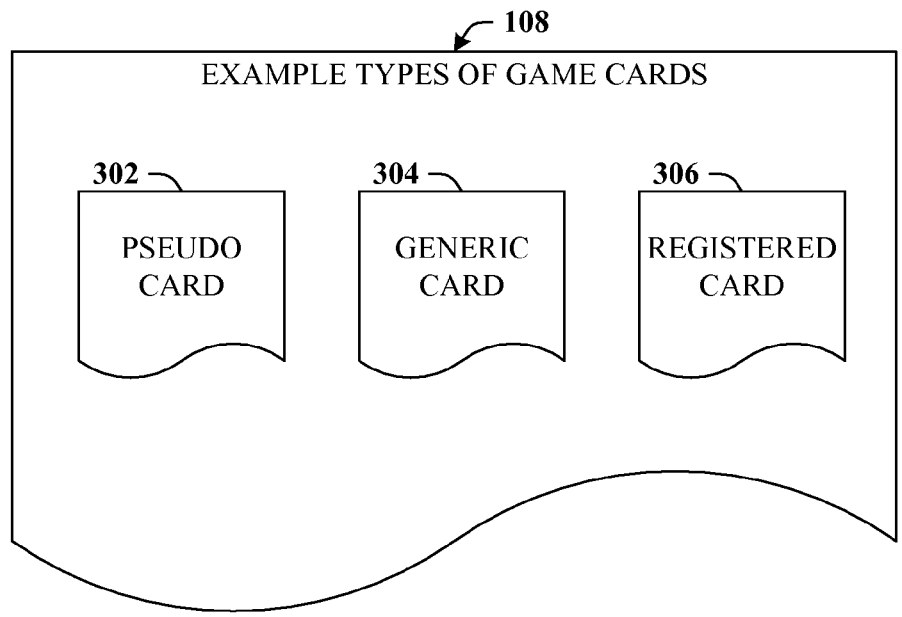
FIG. 3A illustrates example types of game card.
Figure 3B:
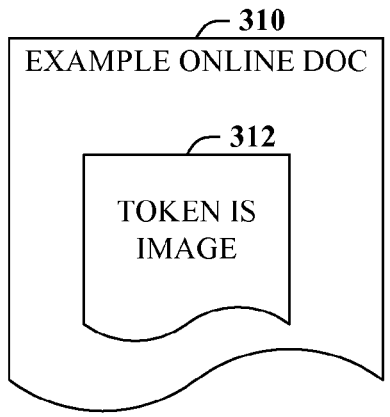
FIG. 3B illustrates an example online documents that include a token as an image and a mechanism for deploying the game cards.
Figure 3C:
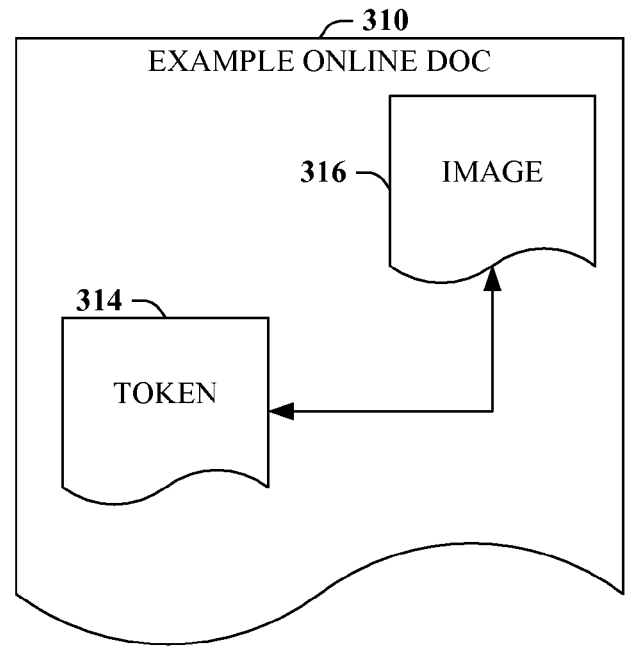
FIG. 3C illustrates an example online documents that include a token that is related to an image and a mechanism for deploying the game cards.

While still referring to FIG. 1, but turning now as well to FIGS. 3A-C, example types of game card 108 as well as example online documents that include a mechanism for deploying the game cards 108 are depicted. The game card 108 can be associated with a globally unique ID (GUID) in order to mitigate duplication and can be cryptographically secured by means known in the art. The game card 108 can exist in a variety of states, some of which are illustrated in FIG. 3A. For example, the game card 108 can be a pseudo game card 302, a generic game card 304, or a registered game card 306.

Briefly, the pseudo game card 302 generally is not a game card 108 that can be directly employed in game play with games 104. Rather, the pseudo game card 302 can be issued by the promoted online service 106 to aid in fraud detection. The generic game card 304 can be, as the name implies a game card 108 that is generic. It can be thought of as a wild card of sorts because it need not be endowed with any particular characteristics, other than that it is a game card 108. When a promoted online service 106 issues a game card 108, it is usually of the generic game card 304 type. A third type of game card 108 can be the registered game card 306. A registered game card 306 can be a game card 108 that has been linked and/or associated with a particular game 106. For example, when a generic game card 304 is deposited into the game space 112 of user 110, the user 110 can subsequently choose which game 104 with which to associate the generic game card 304.

Recall that the games 104 can be designed such that game cards 108 can enhance a gaming experience. An object in one game 104 may be to collect all the various poses of one of several types of cartoon characters, while an object in another game 104 is to challenge an opponent with combatants described by playing cards, while an object of a third game 104 can be to finish various quest levels. The possibilities for how a game card 108 can be employed with the games 104 are unlimited, however, a game card 108 (e.g., generic game card 304) can be registered to one of the games 104, and upon registration, the generic game card 304 can be endowed with attributes in accordance with the rules of the game 104 with which it is associated. Thus, attributes of a generic card 304 can be "revealed" to the user 110 as the generic game card 304 is registered with a particular game 104 and converted to a registered game card 306. Accordingly, in the first instance above, the registered game card 306 can gain attributes of one of the poses for one of the cartoon characters; while in the second instance, the registered game card 306 can be endowed with features of one of the combatants; and in the third instance the registered game card 306 can provide the codes to the next level. Of course the cases provided herein are merely exemplary and are not intended to limit the scope of the claimed subject matter.

Generally, the promoted online service 106 only issues pseudo game cards 302 or generic game cards 304, but in accordance with an aspect of the claimed subject matter, the promoted online service 106 can issue game cards 108 that are already registered to a particular game 104, e.g., in association with game 104 that is sponsored by a third party. However, in this case, it should be appreciated that the actual attributes of the registered game card 306 may not be known (or actually assigned) until the patron 110 visits his or her game space 112 to view the registered game card 306 deposited therein. In fact, depending upon the rules a game 104 enforces, the attributes assigned to a newly registered game card 108 may depend upon features unique to the user 110 such as what other game cards 108 the user 110 has associated with that particular game 104 (e.g., a game card that grants access to the next level of a game 104 may be based upon what level the user is currently engaged).

Moreover, it should be understood that the game cards 108 in whatever state they exist may be perishable, expendable, or persist indefinitely. For example, generic game cards 304 may be required to be registered to a particular game 104 within a certain period of time or they can expire. As another example, registered game cards 306 can be expended such as for games that require a game card 108 in order to gain admittance to the game 104, or in the case where the game 104 destroys registered game cards 306 (e.g., the loser of the game 104 loses one or several of his cards). However, these and other rules are merely exemplary and can be defined and or optionally enforced by the games platform 102 and/or the rules associated with a particular game 104.

In accordance therewith, a user 110 has an incentive to patronize the promoted online service 106. For example, by patronizing the promoted online service 106, the user 110 can be exposed to the potential for receiving game cards 108 that can enhance the user's 110 experiences with the games 104. With reference to FIGS. 3B and 3C, various mechanisms for indicating that a game card 108 is available to a patron 110 of the promoted online service 106 are illustrated.

As previously mentioned, the promoted online service 106 can be substantially any online service such as chat, email, news, sports, weather, maps, dating, career building, shopping, travel, etc. Generally, any such promoted online service 106 will communicate information with a patron 110 by way of some user-interface, which is typically by way of a web browser, but can also be in the form of an application that creates a pop-up or runs in a task bar or side bar, such as a news, stock, or weather bug. Irrespective of the actual implementation, be it a browser search page, a stock ticker, weather bug, or something else entirely, the promoted online service 106 can include within the web document 310 a token.

The token can be a link (with associated anchor text/image) for depositing the game card 108. If the patron 110 clicks on the token, a game card 108 can be deposited into his or her game space 112 as substantially described herein. While the token can be represented to a patron 110 as simply text that indicates "You've won a game card!" (or something similar), in order to mitigate fraudulent activity, the token can be an image as well, as depicted by token 312. For example, one type of fraudulent activity is to employ a "bot" to parse web documents and automatically follow links or some other activity that can be beneficial to a hacker, but detrimental to a service provider for a number of reasons.

It is readily apparent that neither the promoted online service 106 nor the games platform 102 would likely want to allow botting software to search for and retrieve game cards 108. While tests are widely available to detect and/or defeat botting software (e.g., Completely Automated Public Turing Test to Tell Computers and Humans Apart (CAPTCHA), Turking mechanisms, Human Interactive Proofs (HIPs)), it may not be feasible to employ one of these tests each time a game card 108 is retrieved (e.g., doing so could frustrate and/or annoy patrons 110). However, most such tests rely upon images, which humans are quite good at distinguishing, while computers are not.

As such, since the token 312 can be an image, a HIP can be implemented inherently. For example, the image can vary to signify a distinction between a generic card 304 and a pseudo card 302. The patron 110 will know (or could be readily instructed) not to click on tokens 312 with images indicating a pseudo card 302, because these images typically do not result in a game card 108 being deposited. Thus, the promoted online service 106 can issue pseudo cards 302 rather than generic cards 304 in some predetermined ratio (e.g., 10%, 25%, 50% . . . ). If a similar ratio of pseudo cards 304 is deposited into a user's game space 112, it can be inferred that fraudulent activity has occurred or that the user 110 is not yet aware to distinguish between pseudo cards 302 and generic cards 304. In any event, suitable action can be taken by the games platform to curb and/or mitigate fraud. For example, if a certain number of pseudo cards 302 are received in a given period (e.g., a day), then no further game cards 108 (even valid generic cards 302) will be accepted for the remained of the period. In another example, game spaces 112 that receive an inordinately high number of game cards 108 or other suspicious activity can be flagged for further investigation. In addition to what has been described above and herein, a game space 112 flagged as suspicious can be subject to other suitable remedies.

While the token 312 can be an image, the token 314 can also be text and, in some cases, associated with the image 316, as depicted in FIG. 3C. For example, due to aesthetics or some other reason, such as in the case where the promoted online service 106 does not allow images within its content, the token 314 may not itself be an image 316. In those cases, the aforementioned mechanisms for fraud prevention can still be employed in precisely the same manner. For example, even promoted online services 106 that do not allow images in the results often still contain images (e.g., in the header/banner, etc.). Such images 316 can be employed to distinguished between pseudo cards 302 and generic cards 302, even though the images 316 are not part of the token 314 that can be clicked to deposit a game card 108. It is also to be appreciated that the token can be implemented in connection with an audio file (rather than an image 316) that can have the similar properties of defeating bots, but can also be more effectively employed by patrons 110 who are visually impaired.

Figure 4:
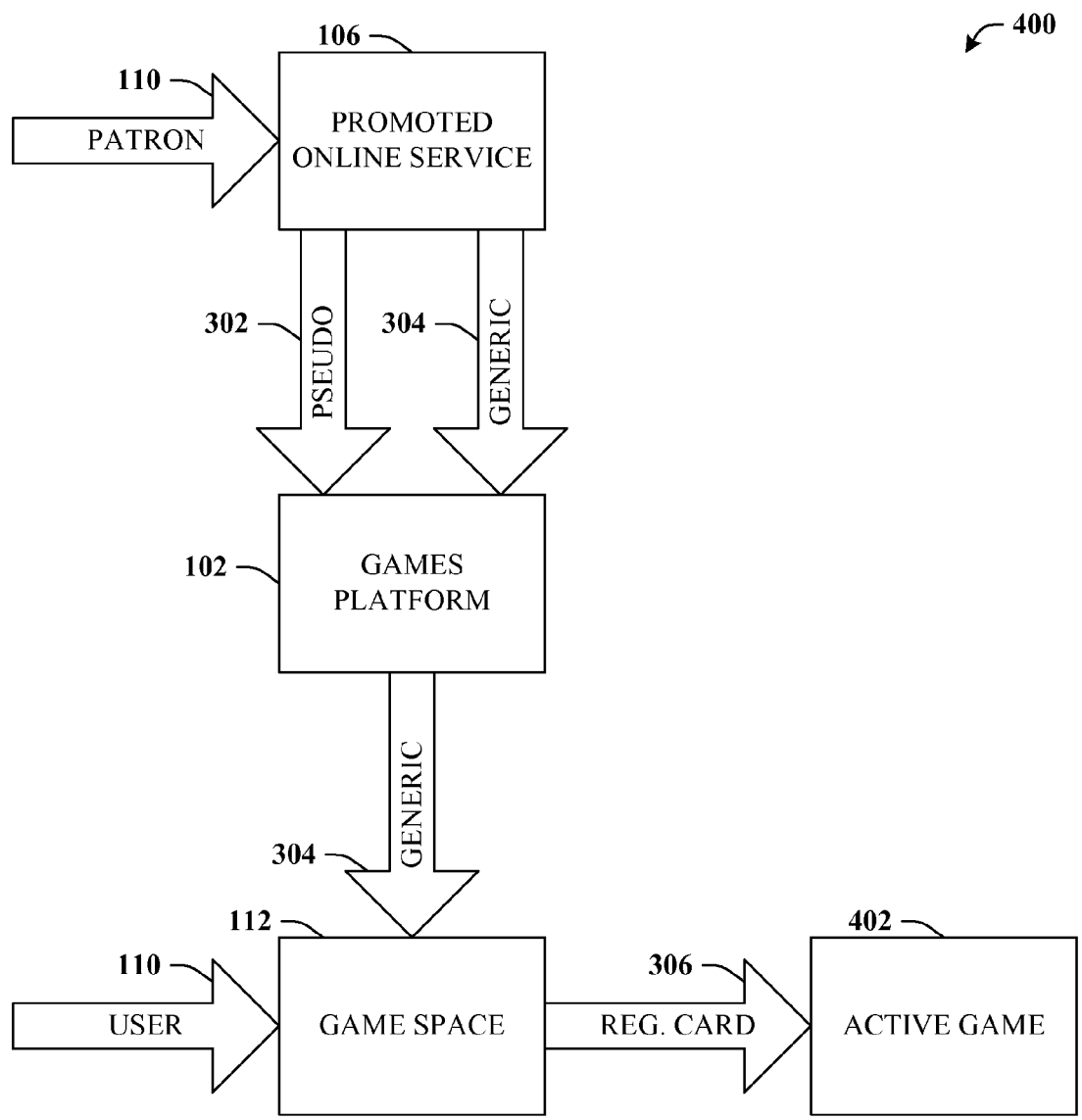
FIG. 4 is a block diagram of a computer-implemented system that can facilitate registration of game cards to active games.

With reference now to FIG. 4, a computer-implemented system 400 that can facilitate registration of game cards to active games is illustrated. Generally the system can include the games platform 102 and one or more game cards in any of the suitable varieties (e.g., pseudo, generic, registered) as substantially described in connection with FIG. 1. The patron 110 can patronize the promoted online service 106 upon which the patron can be periodically and/or temporally presented a token amidst the usual content the promoted online service 106 generally delivers. The token can signify that a game card is available. If the patron retrieves this game card (e.g., by clicking on the token), then depending upon the type of game card issued, either a pseudo game card 302 or a generic game card 304 can be transmitted to the games platform 102, whereupon a generic game card 304 can be deposited into the game space 112. Typically, as depicted, only generic game cards 304 are deposited into the game space 112, however, in the case where the promoted online service 106 issues a registered game card 306, the registered game card 306 can also be deposited (not shown) into the game space 112. Moreover, while pseudo game cards 302 largely exist in order to detect fraud, and generally do not result in a registered game card 306, they might also be "deposited" into the game space 112 such as to increment a counter that indicates the number of pseudo game cards 302 that the patron 110 has retrieved and/or as a reminder to avoid retrieving these types of game cards 108.

When the user 110 navigates to his or her game space 112, the user can be presented with the collected generic (etc.) cards 304. As yet, these generic cards 304 are typically featureless. However, these generic cards 304 can be bound to a particular game (e.g., registered) upon which the generic card 304 takes on appropriate attributes suitable to the game with which it is registered, and these attributes can then be revealed to the user 110. It is to be appreciated that the user 110 of the games platform 102 can choose to play any of the games from the set of games 104 (from FIG. 1). However, according to an aspect, the games platform 102 can limit the number of games the user 110 has active at a given time. For example, the games platform 102 may limit the number of active games to, say five. In that case, the user 110, while usually free to select which games are active for her, she is limited to only five. Such a regulation is not strictly necessary, but can be enforced by the games platform 102 in order to prevent dilution of game card use and/or game experience with respect to content.

In accordance therewith, the games platform 102 can restrict conversion of a generic game card 304 only to an active game 402. Thus, if the user 110 has 5 active games 402, but wants to register the generic card 304 with a different sixth game, it may be necessary to deactivate one of the five active games 402 first. Typically, all registered game cards 306 that were registered to the subsequently deactivated game are destroyed. As such, the games platform 102 provides a persistent need for more games cards, which can continually drive the promotions. However, again, this rule need not be employed in all cases. For example, the games platform 102 can return a fraction or even all of the registered game cards 306 upon deactivation of a game. In those cases, the returned game cards can be deposited into the game space 112 as generic cards 302, or in another suitable manner.

By way of an additional non-limiting illustration consider the following scenario. Bob enjoys managing his stock portfolio, and as such keeps a stock ticker on his desktop to alert him of news and quotes relating to his portfolio. Bob's favorite niece, Ashley, and nephew, Ross, are avid game players and each has their own game space on the games platform. They notice that one of the promoted online services is for a stock service and convince uncle Bob to try this new online service. Bob agrees, and registers with the promoted online service and subsequently uses the new stock ticker in lieu of the previous one, and also quickly configures his own game space to automatically deposit received game cards into Ashley's and Ross's game space in equal amounts.

Periodically, when Bob is checking the stock ticker, he notices a token indicating a game card is available. Bob avoids clicking on the tokens that relate to pseudo game cards, but contentiously clicks on the tokens relating to generic game cards, much to the delight of his niece and nephew. Eventually, Bob discovers that he really enjoys a particular word game offered by the game platform, so he reconfigures his game space to keep one third of the game cards received for him, and automatically transmit the other two-thirds in equal amounts to Ashley and Ross. Bob then discovers a learning game certified by the games platform that requires one game card to play and can be configured to allow users other than the one providing the game card to play.

Bob allocates a portion of his game cards directly to this learning game whereby his game cards provide Ashley and Ross access to the game, where each is presented suitable math problems. If a requisite number of problems are correctly answered, a number of game cards can be generated and deposited into Ashley's and Ross's respective accounts automatically, which they can subsequently register with games of their own choosing. In some case, other rewards can be provided such as a coupon for a free ice cream from a local business, etc.

According to an aspect, a certificate of excellence can be deposited in Ashley's (or Ross's) game space with her name and achievement to indicate superlative success on the questions. In accordance with another aspect, this certificate can serve as the coupon for a local sponsoring business (e.g., the ice cream parlor). The local business may sponsor such to promote goodwill and/or because it is likely that Bob will buy products as well when he takes his niece and nephew to the ice-cream parlor. To mitigate fraud, the coupon can be valid only for Ashley and the local business can at least verify the age and gender of the party redeeming the coupon.

Figure 5:
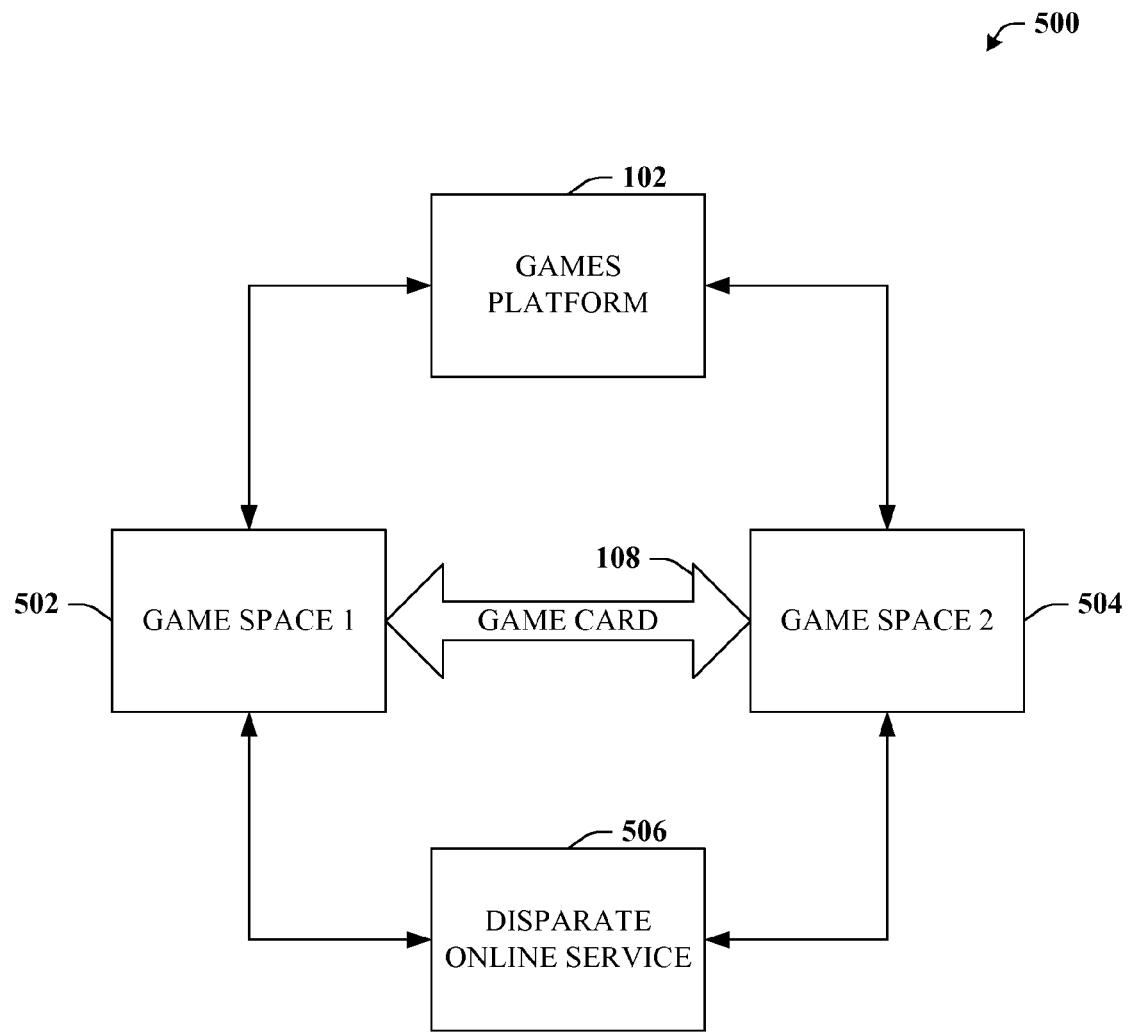
FIG. 5 depicts a computer-implemented system that can facilitate trading of game cards.

Referring now to FIG. 5, a computer-implemented system 500 that can facilitate trading of game cards is depicted. Generally, the system 500 can include the games platform 102 and a game card 108, which can be either a generic game card or a registered game card. The system 500 can also include a first game space 502 and a second game space 504 between which the transaction associated with the game card 108 is to occur. It is readily apparent that the games platform 102 can facilitate the trade from one game space 502, 504 to another game space 502, 504. Normally, a game card 108 in any state (e.g., generic, registered) can be traded, but in some cases, the games platform 102 can limit the ability to trade when the game card is in one state or the other. For example, trading generic cards provides for a more flexible medium of exchange, since these can be converted to any game provided to the game space (limited in some cases to only the active games of the receiving user). But since registered cards are assigned attributes by a particular game, it may no longer be of use to any but that particular game or affiliated games. However, trading these types of cards can foster esoteric and interesting niches relevant to the particular game's content. Accordingly, the games platform can open or restrict card trading in a manner suitable to achieving these or other goals.

In accordance with an aspect of the claimed subject matter, once the game card 108 is deposited into a game space 502, 504, it can be traded by a means other than the games platform 102, such as by a disparate online service 506. In many cases, the game card 108 can only be traded by way of very particular disparate online services 506, e.g., disparate online services 506 that are trusted by the games platform 102; disparate online services 506, that share a universal login identity with the games platform 102; only a promoted online service; and/or disparate online services 506 wherein the games platform 102 can monitor transactions relating to the game card 108 and/or enforce games platform 102 rules, etc.

While the games platform 102 itself can provide a convenient mechanism for trading game cards 108, a suitable disparate online service 506 (e.g., an online messaging service) may provide advantages as well. For example, if the disparate online service 506 is also a promoted service then, utilizing the promoted service to trade game cards 108 can generate opportunities to get additional game cards 108. As another example, a third party may be sponsoring a particular game, and want to restrict trading of game cards 108 registered with the sponsored game only to a particular disparate online service 506. As a further example, a user of the games platform 102 may want to entice a friend to join the games platform 102. As such the friend may not have an account (or an associated game space 502, 504). Therefore, the user can send the game card 108 by way of disparate online service 506.

It is to be appreciated that the games platform 102 can support many configurable options relating to game card trading. For example, a user can configure his or her game space 502, 504 to make all registered game cards visible to other users, only visible to those on a buddy list, or some other combination. Moreover, individual game cards 108 can be configured with privileges such that they can be traded automatically with anyone, require assent first, etc. For example, if a user is playing a game that facilitates collection of all poses for a certain cartoon character, while the user's friend is playing the same game, but with a different cartoon character being collected, then trades may be readily configured and readily made between the two users.

Figure 6:
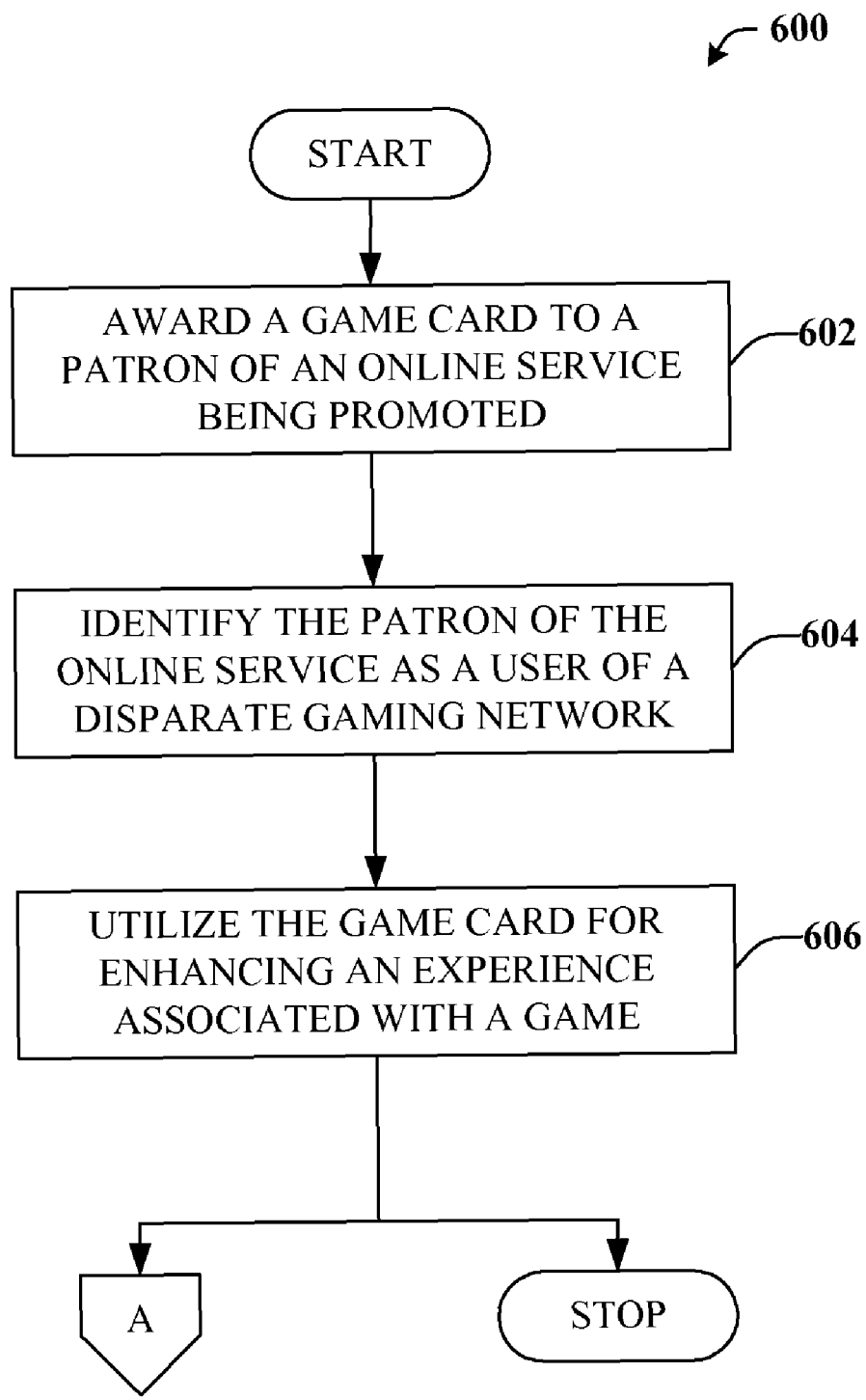
FIG. 6 depicts an exemplary flow chart of procedures defining a computer-implemented method for promoting online services.
Figure 7:
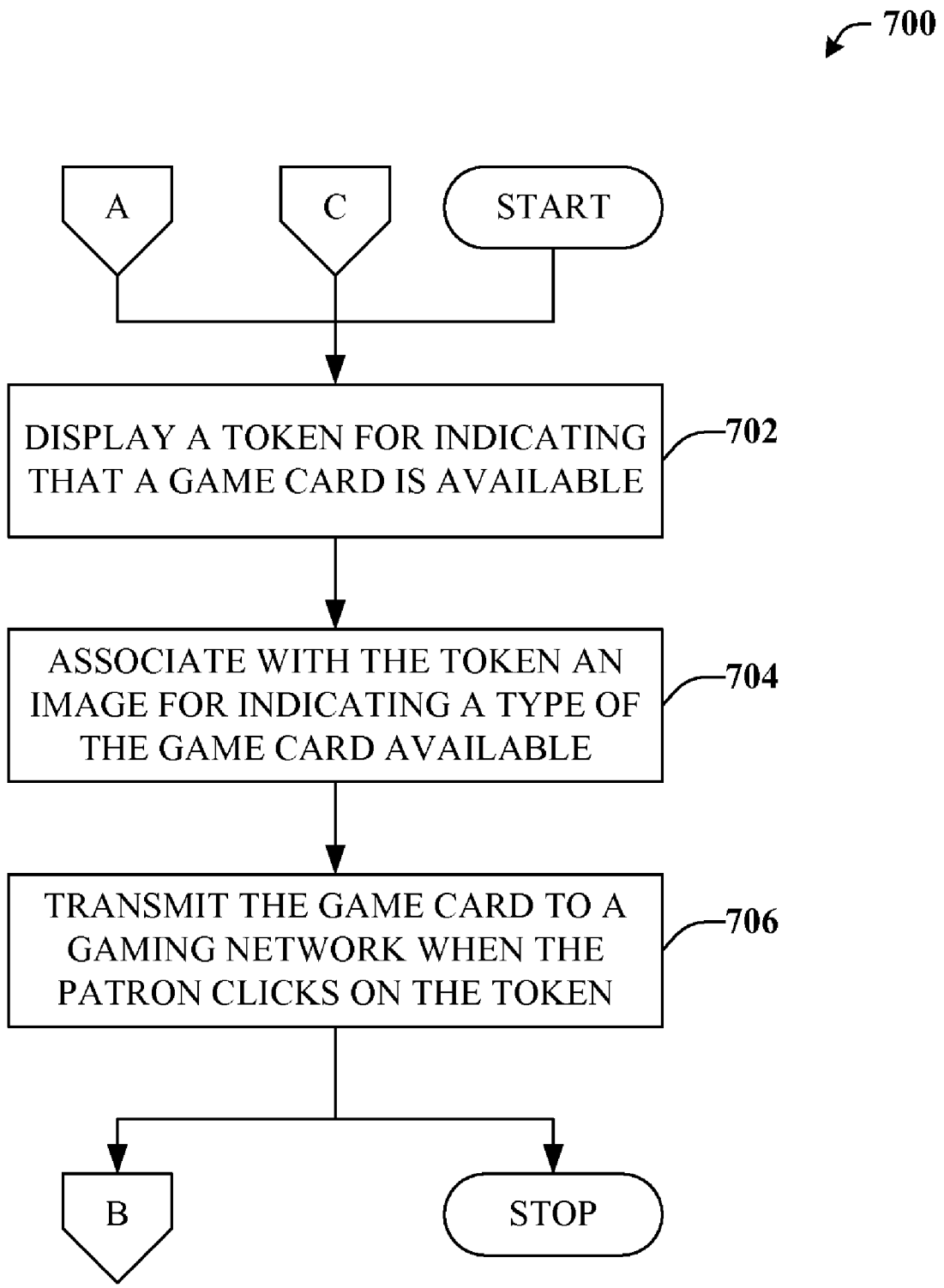
FIG. 7 illustrates an exemplary flow chart of procedures defining a computer-implemented method for awarding an issued game card to a patron.
Figure 8:
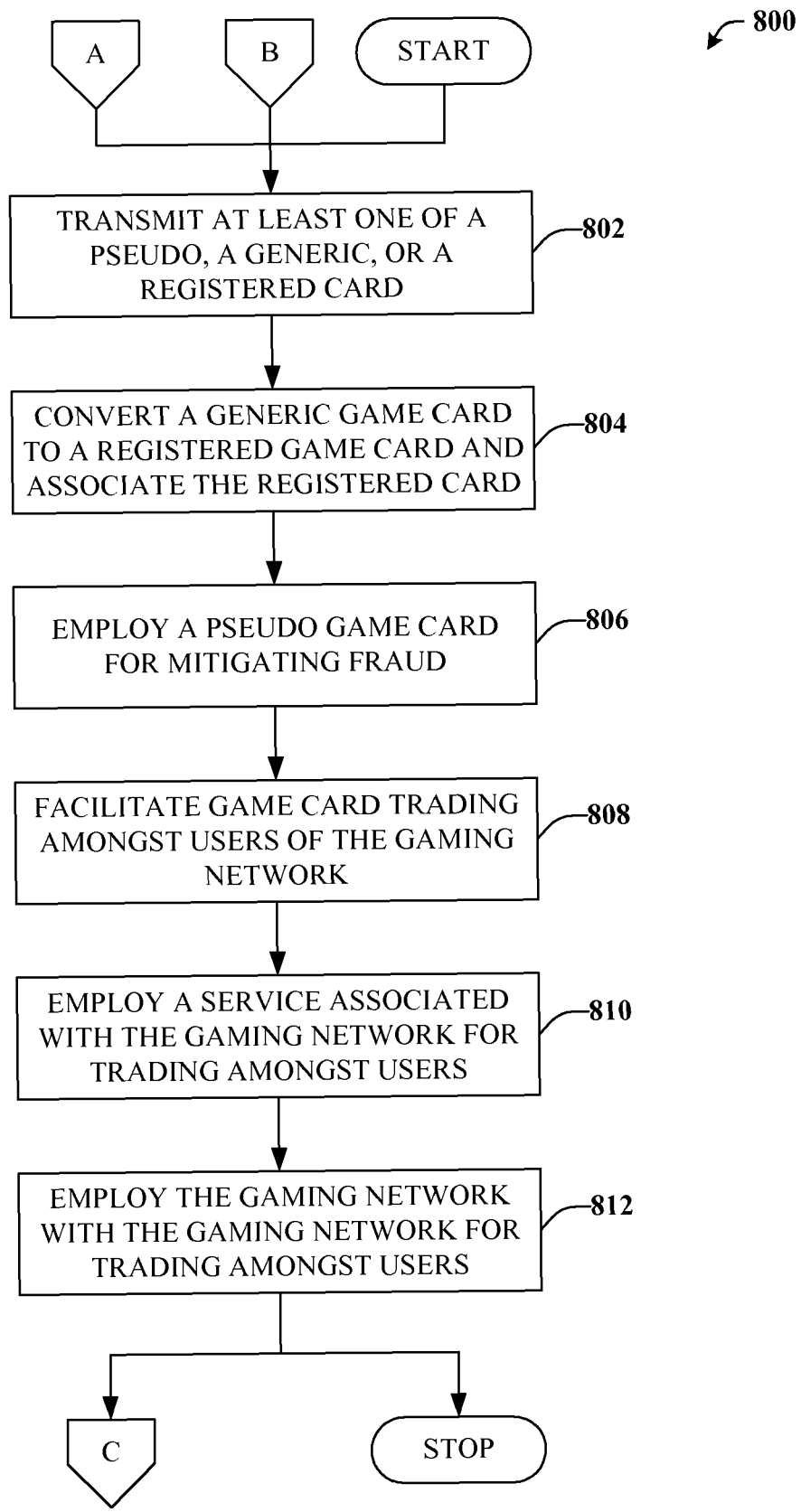
FIG. 8 depicts an exemplary flow chart of procedures defining a computer-implemented method for facilitating game card transitions.

FIGS. 6, 7, and 8 illustrate methodologies in accordance with the claimed subject matter. While, for purposes of simplicity of explanation, these and other methodologies herein are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 6, a computer-implemented method 600 for promoting online services is provided. Generally, at reference numeral 602, a game card can be awarded to a patron of an online service being promoted. For example, a gaming network can exist in which users of the gaming network are encouraged to patronize the online service being promoted. One such incentive can be the opportunity to receive a game card that can be employed with a game provided by the gaming network.

At reference numeral 604, the patron of the online service can be identified as a user of the gaming network that is promoting the online service. One manner of accomplishing this is by way of a universal login ID that operates as an identity for both patrons of the online service and users of the gaming network. It is to be appreciated that other means exist such as by way of a cookie installed on the patron's machine. At reference numeral 606, the game card awarded can be utilized for enhancing an experience associated with a game provided by the gaming network. For example, the game card can be employed as a game piece for a board game, "ticket" for admission to a game, or any of unlimited other purposes based upon rules defined by the game.

FIG. 7 illustrates a computer-implemented method 700 for awarding an issued game card to a patron. At reference numeral 702, a token for indicating that a game card is available can be displayed. It is to be appreciated that in accordance with an aspect, the token need not be displayed if the patron is not identified as a user of the gaming network (as described at act 604 in connection with FIG. 6), and/or the user is not logged into the gaming network, at least in a passive capacity.

At reference numeral 704, an image (or another form of media such as audio) can be associated with the token. The contents and/or design of the image can be employed for indicating a type of the game card that is available. For example, the image can differ according to whether the game card available is a pseudo card, a generic card, or, in some cases another type of game card (e.g., a registered card, or another type altogether). It is to be appreciated that the online service and/or the gaming network need not implement pseudo cards; however, doing so can facilitate fraud prevention.

At reference numeral 706, the game card can be transmitted to the gaming network. Generally, the game card is transmitted when the patron clicks on the token, however, other means of illustrating an acceptance of the game card are envisioned and to be included within the scope of the appended claims. For example, the patron can retrieve the game card by way of oral instructions, etc.

Turning now to FIG. 8, a computer-implemented method 800 for facilitating game card transitions is depicted. At reference numeral 802, at least one of a pseudo game card, a generic game card, or a registered game card can be transmitted to the gaming network. Typically, the online service both issues and transmits the game card as substantially described in connection with acts 704 and 706 from FIG. 7.

At reference numeral 804, a generic game card can be converted to a registered game card. For example, the user can link the generic card to a particular game in order to convert it to a registered card. Since generic cards typically do not have any defined features, the game in which the registered card is associated can define what attributes the card is to adopt, in essence, "revealing" the nature of the card to the user. It is to be appreciated that if the game card transmitted in accordance with act 802 is a registered card, then it can already be bound to a particular game, but it may still need to have associated attributes defined by the rules of the particular game and, thus, revealed to the user.

If the game card transmitted in accordance with act 802 is a pseudo card, then, at reference numeral 806, the pseudo card can be employed for purposes relating to fraud mitigation. For example, if the gaming network is in receipt of a high number of pseudo game cards associated with a particular game space and/or user, then the account can be flagged for further investigation. Moreover, suspicious activity can result in a forfeiture of some or many of a user's game cards.

At reference numeral 808, game card trading can be facilitated amongst users. Generally, both registered and generic cards can be traded; however, due to the respective natures of both, certain types of trades can be prohibited in accordance with a rule set implemented by the gaming network. For example, it is generally of little value to exchange one generic card for another generic card. Thus, trades involving generic cards will typically be limited to one-way transfers, or swaps (e.g., one card for another card) if the swap also involves a registered card such as, e.g., trading two generic cards for one registered that has attributes particularly coveted by one of the parties to the transaction. It is to be appreciated that other assets can potentially exist on the gaming network and/or the game space of users for which game cards can be exchanged.

At reference numeral 810, a service associated with the gaming network can be employed for facilitating the game card trading described in connection with act 808. By "associated" in this case, it is intended to mean that the gaming network allows such transactions, and as such might still be able to enforce rule sets related to the gaming network, the game cards, and/or the games provided by the gaming network (e.g., the online service and the gaming network share a universal login identity for the respective accounts of a user. "Associated" is not intended to mean that the service is a subsidiary of the gaming network. Rather, the service can be a disparate service, and even a disparate service the gaming network is promoting, as substantially described supra. At reference numeral 812, the gaming network can be employed for facilitating the game card trading detailed at act 808.

Figure 9:
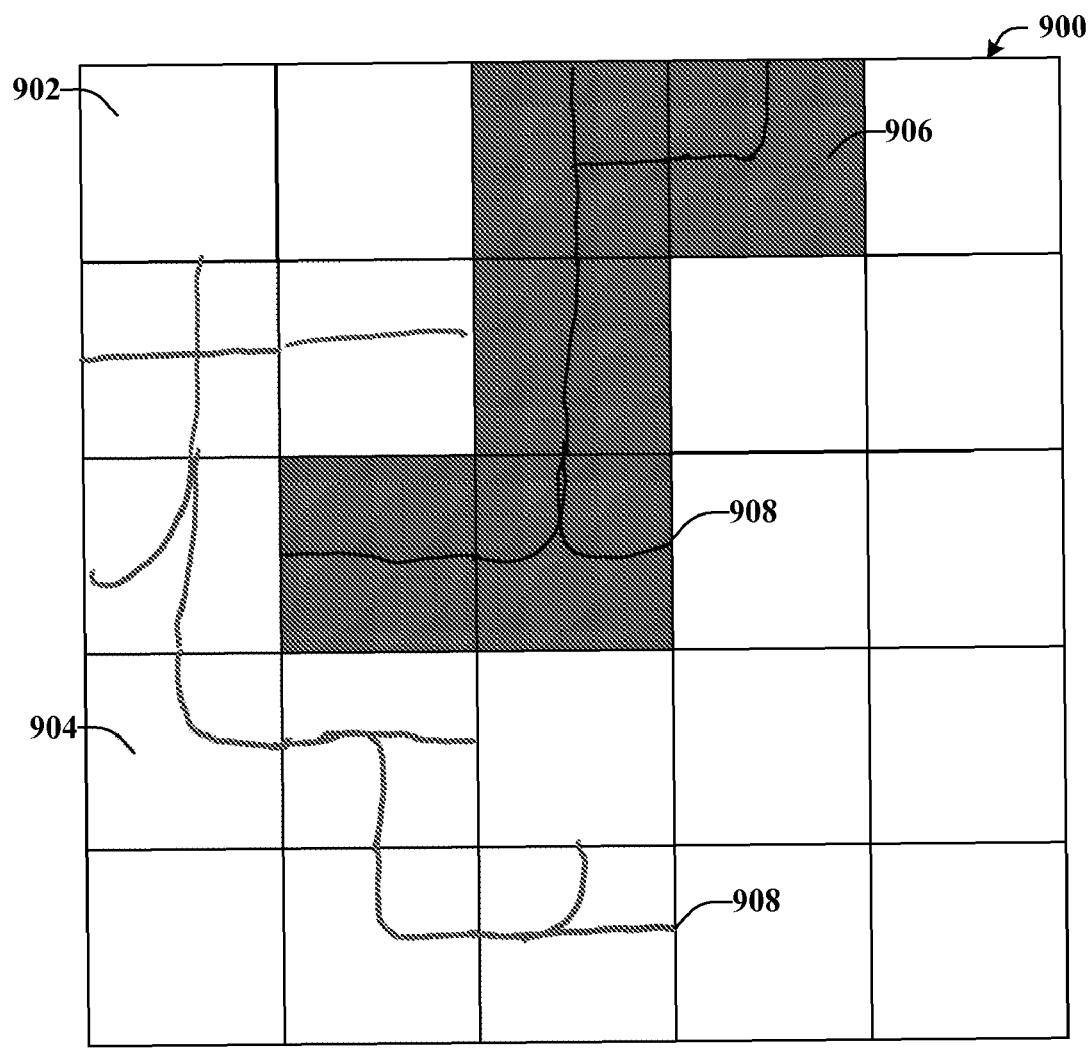
FIG. 9 depicts an illustration of an exemplary game.

In reference to FIG. 9, an illustration of an exemplary game 900 is depicted. It is to be understood that the game is intended to provide one concrete example to aid in understanding of the claimed subject matter, but is not intended to be limiting to only the aspects described. As shown, the board of the game 900 is comprised of 25 blocks 902, five blocks 902 for each column and row. The game 900 can be, e.g., a two-person (or more) competitive pattern game 900. The object of the game 900 is for one player to create a continuous path from the left side of the board to the right side (e.g., the object for the player with the lighter shaded game tiles 904). The object for the player using the darker shaded game tiles 906 is to construct a continuous path from the top to the bottom of the board.

Play alternates from one player to the next, where each player places a tile from his or her "tile library" on the board in blocks 902 adjacent to one where a tile 904, 906 has been already placed. As illustrated, each tile 904, 906 includes a path 908 that can be connected to previously or subsequently placed tiles 904, 906. Tiles 904, 906 can be placed on vacant blocks 902 or superimposed over other tiles 904, 906, and both players can use all available paths 908 to reach the respective destination.

It is to be appreciated that game play, as well as the potential for victory can be a function of the tiles 904, 906 in a player's tile library. Moreover, the tile library can be built by the game cards (e.g., game cards 108 from FIG. 1) described herein. For example, a user can register a generic game card with the game 900, upon which the registered game card is endowed with attributes assigned it by the game 900. In accordance therewith, a user's experiences with respect to the game 900 can be enhanced by game cards.

Figure 10:
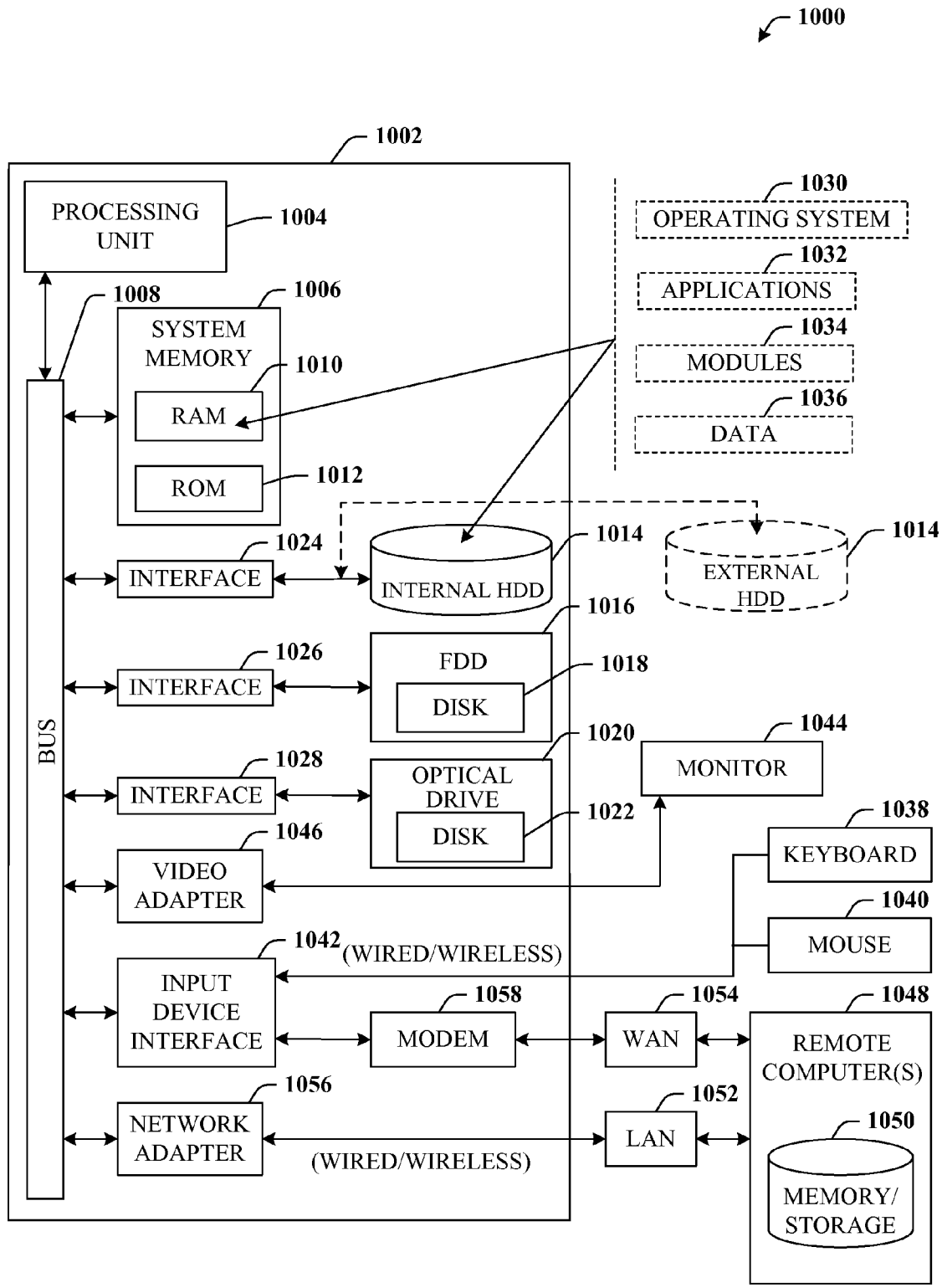
FIG. 10 illustrates a block diagram of a computer operable to execute the disclosed architecture.

Referring now to FIG. 10, there is illustrated a block diagram of an exemplary computer system operable to execute the disclosed architecture. In order to provide additional context for various aspects of the subject invention, FIG. 10 and the following discussion are intended to provide a brief, general description of a suitable computing environment 1000 in which the various aspects of the invention can be implemented. Additionally, while the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the invention includes a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a nonvolatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE1394 interface technologies. Other external drive connection technologies are within contemplation of the subject invention.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the invention can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
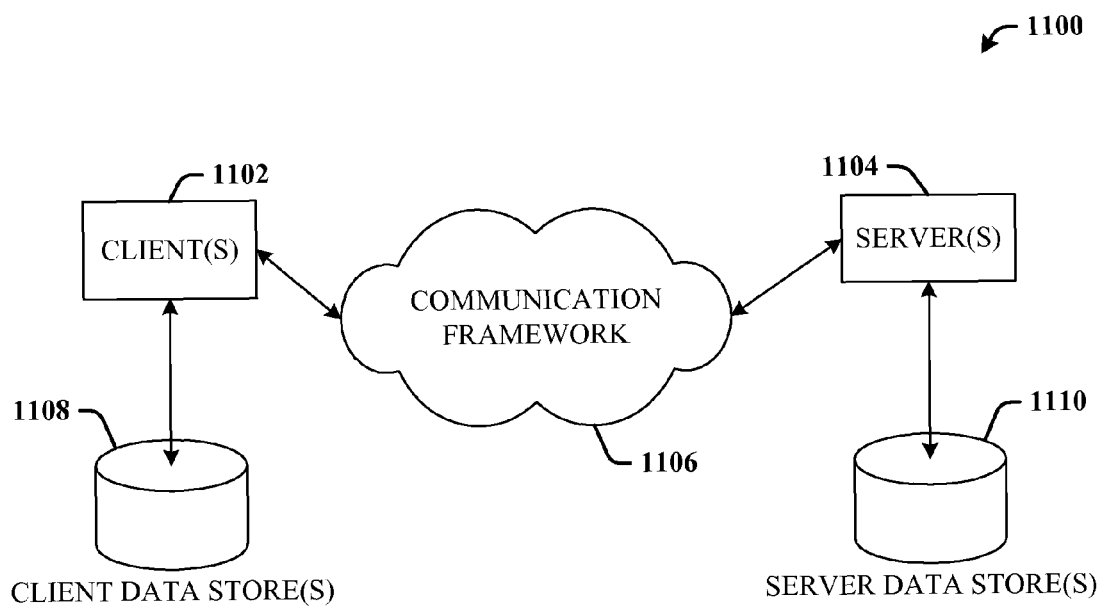
FIG. 11 illustrates a schematic block diagram of an exemplary computing environment.

Referring now to FIG. 11, there is illustrated a schematic block diagram of an exemplary computer compilation system operable to execute the disclosed architecture. The system 1100 includes one or more client(s) 1102. The client(s) 1102 can be hardware and/or software (e.g., threads, processes, computing devices). The client(s) 1102 can house cookie(s) and/or associated contextual information by employing the invention, for example.

The system 1100 also includes one or more server(s) 1104. The server(s) 1104 can also be hardware and/or software (e.g., threads, processes, computing devices). The servers 1104 can house threads to perform transformations by employing the invention, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer-implemented system that hosts games, wherein a gaming experience is a function of usage of a service, comprising:
   a games platform that provides access to a set of games and that promotes a disparate online service;
   a plurality of game cards that facilitates an enhanced experience for a game from the set of games, the plurality of game cards are issued by the promoted online service, wherein the plurality of game cards comprises:
      a generic game card associated with a first image; and
      a pseudo game card associated with a second image that distinguishes the pseudo game card from the generic game card;
   wherein the promoted online service issues a known ratio of generic game cards to pseudo game cards.

2. The system of claim 1, wherein the generic game card that is available for retrieval to patrons of the promoted online service.

3. The system of claim 1, the promoted online service includes an image in an online document associated with the promoted online service to indicate that the generic game card is available.

4. The system of claim 1, wherein the generic game card is retrieved from the promoted online service and deposited into a game space associated with an account of a user of the games platform.

5. The system of claim 4, wherein the generic game space enforces rules associated the game card.

6. The system of claim 4, wherein the generic game card is converted to a registered game card upon association with the game.

7. The system of claim 5, wherein the registered game card is assigned attributes in accordance with rules defined by the game.

8. The system of claim 1, wherein the generic games platform facilitates an exchange of the game card from a first user account to a second user account.

9. The system of claim 8, wherein the generic game card is assigned attributes in accordance with a set of rules defined by the game and the exchange is facilitated in accordance with the set of rules.

10. The system of claim 1, wherein the generic game card is assigned attributes in accordance with a set of rules defined by the game and the games platform facilitates a transaction that associates the game card to a second game in accordance the set of rules or a second set of rules defined by the second game.

11. The system of claim 1, wherein the pseudo game card is retrieved from the promoted online service and deposited into a game space associated with an account of a user of the games platform.

12. The system of claim 1, wherein the games platform employs the ratio of generic game cards to pseudo game card in order to facilitate fraud detection.

13. A computer-implemented method for promoting online services, comprising:
   displaying a token indicating at least one of a plurality of game cards, wherein the plurality of game cards comprises:
      a pseudo game card;
      a generic game card; and
      a registered game card;
   awarding a particular game card to a patron of an online service being promoted;
   identifying the patron of the online service as a user of a disparate gaming network that is promoting the online service;
   transmitting the particular game card to a game space associated with the patron;
   detecting fraud based upon a ratio of generic game cards to pseudo cards in the game space associated with the patron; and
   utilizing the game card for enhancing an experience associated with a game provided by the gaming network.

14. The method of claim 13, further comprising associating with the token an image for indicating a type of the game card available.

15. The method of claim 14, further comprising at least one of the following acts:
   transmitting the game card to the gaming network when the patron clicks on the token;
   converting the generic game card to a registered game card, and associating the registered game card with a game; or
   facilitating game card trading amongst users of the gaming network.

16. The method of claim 15, further comprising employing a service associated with the gaming network for trading amongst users or trading between games for a particular user.

17. The method of claim 15, further comprising employing the games network for trading amongst the users or trading between games for a particular user.

18. A computer-implemented system for promoting online services, comprising:
- computer-implemented means for presenting a plurality of game cards to a patron of an online service being promoted, wherein the plurality of cards comprises at least a first type of game card and a second type of game card;
- computer-implemented means for identifying the patron of the online service as a user of a disparate gaming network that is promoting the online service;
- computer-implemented means for identifying fraud based upon a ratio of a number of first type of game cards versus a number of second type of game cards stored in a game space associated with the patron; and
- computer-implemented means for employing the game card for enhancing an experience associated with a game provided by the gaming network.

* * * * *